No. 731,046. PATENTED JUNE 16, 1903.
D. GRAF.
FILM CAMERA.
APPLICATION FILED SEPT. 22, 1902.
NO MODEL.
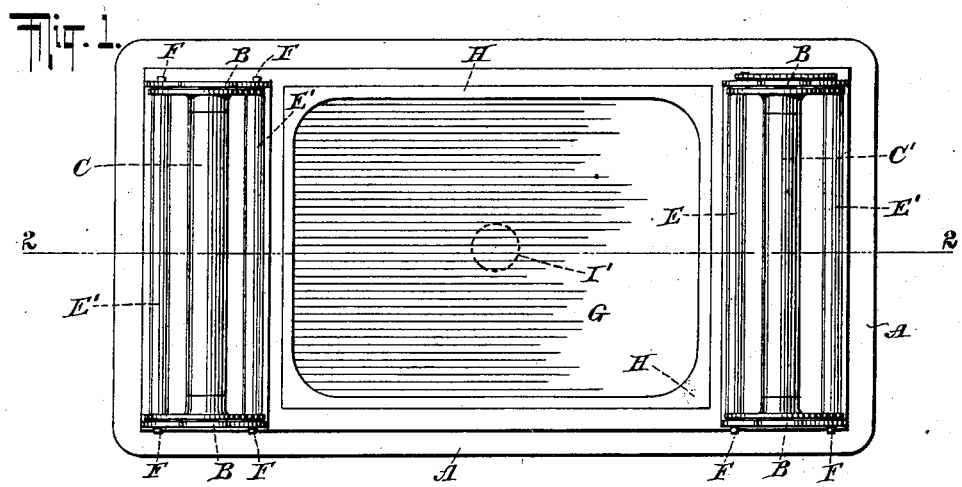
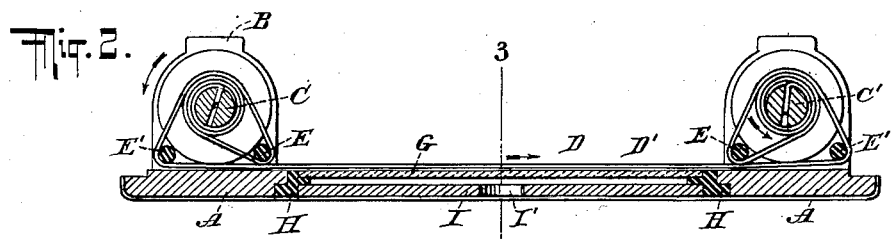
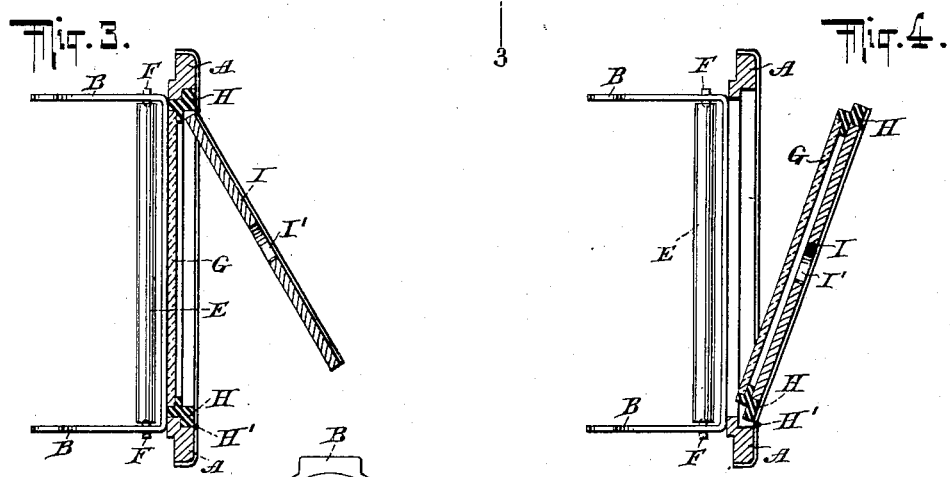
WITNESSES:
J. A. Kehlenbeck
John Lotka
INVENTOR
Daniel Graf
BY Briesen & Knauth
HIS ATTORNEYS No. 731,046.

Patented June 16, 1903.

UNITED STATES PATENT OFFICE.

DANIEL GRAF, OF DEMAREST, NEW JERSEY.

FILM-CAMERA.

SPECIFICATION forming part of Letters Patent No. 731,046, dated June 16, 1903.

Application filed September 22, 1902. Serial No. 124,259. (No model.)

*To all whom it may concern:*

Be it known that I, DANIEL GRAF, a citizen of the United States, residing in Demarest, county of Bergen, and State of New Jersey, have invented certain new and useful Improvements in Film-Cameras, of which the following is a specification.

My invention relates to film-cameras, and particularly to that class in which the film is employed in conjunction with a backing of opaque or non-actinic material, such as black paper.

Various devices have been employed to prevent the spread of the light laterally, so that only that portion of the film which is to receive the image will be exposed to the light passing through the lens.

My present invention has for its object to provide a very simple construction for the above-indicated purpose in which the film itself, with its backing, is conducted in such a manner over guides appropriately placed that it will form a shield or protector confining the light to the portion of the film upon which the image is to be produced.

Another feature of my invention relates to the means by which a portion of the non-actinic backing may be rendered visible to the operator, and this part of my invention has been designed with the object of enabling a camera possessing this feature to be used for films or for plates and to enable the material through which the backing of the film is observed to be used as a focusing-glass in lieu of the customary ground glass.

An example of my invention is shown in the accompanying drawings, in which—

Figure 1 is an inside or front view of a camera-back embodying my invention. Fig. 2 is a cross-section on line 2 2 of Fig. 1. Fig. 3 is a sectional elevation on line 3 3 of Fig. 2 with the outer cover raised to allow the film to be observed. Fig. 4 illustrates the use of my invention for focusing purposes. Fig. 5 is a detail of a slightly-different form of my invention, and Fig. 6 shows a further form of the invention.

A is the back of the camera, and this back may form part of the camera-body, or it may be detachable, according to the customary construction of many film-cameras. This back carries at opposite sides plates or brackets B, in which are journaled the spindles C C', respectively, one of which serves as a support for the unused portion of the film, (at the left in Figs. 1 and 2,) while the other (at the right in Figs. 1 and 2) serves to wind up the exposed portion of the film. This construction is so well known that I shall not further describe the details thereof.

The film proper is of the well-known character, in which a film D is combined with a backing D' of non-actinic material, such as black paper, this backing to be provided at regular intervals with suitable indications, such as successive numerals, serving to properly position the film for the successive exposures.

Within the lines of the brackets B and adjacent to the back A are located guides E E', preferably in the nature of rollers, which may be journaled by means of trunnions or pins F. These guides are preferably located slightly to the side of each of the spindles C C', one upon the inside thereof and the other upon the outside.

In the back A, I provide an opening in which is set substantially flush with the inner surface of the back a plate G of colored glass, so as to destroy or at least diminish the actinic activity of rays of light passing through said glass. This glass plate is made of substantially the same size as the image which is produced by the lens, and is therefore adapted to be used for focusing purposes, as will be described hereinafter. Preferably the glass plate is not set in the back A directly, but in an auxiliary frame H, which is hinged to the back at H' and may be opened, as shown in Fig. 4. Thus when the camera is used for plates the frame H may after focusing be folded down, so as to allow a plate-holder of suitable dimensions to be inserted in the place formerly occupied by the frame H. In order that the glass plate G may be normally covered, I provide a lid I, preferably hinged to the frame H at the top, as shown in Fig. 3, so that by opening the lid the operator may look at the glass plate G and may through the same observe the position of the numbers or other signs which are marked upon the outer surface of the backing D'. Suitable catches may be employed for holding the lid I and the frame H in their closed positions. I may also make the lid I with an opening I' to permit of observing the backing of the film through the glass plate G without opening the lid.

In making use of a film-holder constructed as described I first insert the roll of film at the place indicated by the spindle C in Figs. 1 and 2, and after having released the outer end of the film I pass the same, together with the backing D', under the inner roller or guide E, which is adjacent to the said spindle C. I then pass the film and backing upward over the roll which is on the spindle C and thread them to the outside of the guide E' and under the guides E' E along the inner surface of the back. Then the backing is passed under the guides E E' at the right-hand side and loosely over the winding-spindle C', then under the right-hand guide E, and finally into the slit of the spindle C'. It is well known that films of this character are provided with a backing which is considerably longer than the film, so that at first only the backing is threaded, as just described. When, however, the spindle C' is turned, the film will be gradually fed, so that its first portion will get into the field of exposure. It will be seen that the portions of the backing which extend from the two rolls or spindles to the inner guides E form shields, which prevent the passage of light sidewise beyond the guides E, and thus efficient protection is given to that portion of the film which should not be exposed. Thus the film, with its backing, instead of being wound continuously upon the spindles C and C' is formed with loops, as it were, at each of the spindles, which loops are passed from the spindles, or rather from the rolls, around guides which are adjacent to that portion of the film which is in the field of exposure, and thus the side portions of the film and of the backing form shields, as above described. It will of course be understood that the brackets B are made of sufficient width to act in conjunction with the portions of the film which, as just mentioned, form shields.

It will be obvious from the description so far given that the outer guides E' are not required to secure the result indicated, and these guides may be omitted, as in the construction illustrated by Fig. 5, which otherwise is exactly the same as above described.

It will be understood that the portion of the backing which passes over the guides at each side of the field of exposure while it moves with the film does not alter its position relatively to the field of exposure, at least at those points where the said shields are adjacent to the portion of the film which is in the field of exposure. Thus the shields arrest the spread of the light at practically always the same point, or, in other words, the width of the film portion to which the light has access does not vary, as the film in passing from one spindle to the other causes the wound-up portion to increase in diameter.

In some cases the threading of the film into position is facilitated by having the rollers or guides E, and sometimes the rollers or guides E', mounted, so that they can move toward and from the back A. Thus in Fig. 6 I have shown both rollers E and E' movably mounted in inclined slots B' of the bracket B, and in inserting the film the rollers may be moved away from the back, and when the film has been properly threaded the rollers may be brought adjacent to the back, either simply by the tension of the film or by means of a spring, such as indicated at J.

I desire it to be understood that various modifications may be made without departing from the nature of my invention.

The employment of a colored plate of transparent material, such as glass or celluloid, for focusing purposes presents advantages over the use of the customary ground glass, as the lines are sharper and it is easier to obtain a proper focusing on account of the subdued light, which, however, does not detract from the distinctness of the image.

The auxiliary frame H has been described as a hinged frame. I desire it to be understood, however, that this is only a specific instance of my invention, which relates more broadly to a combination including a movable auxiliary frame so arranged that it may make room for a plate-holder.

What I claim as new, and desire to secure by Letters Patent, is—

1. The combination with a camera-back and brackets adapted to support the spindles of film-rolls, of guides located adjacent to the back upon the inside and the outside respectively of the said spindles, whereby a film having a non-actinic backing may be so threaded upon said guides and the spindles that a portion of the backing will form a shield preventing the spread of light sidewise beyond the field of exposure.

2. A photographic-film-roll carrier comprising film-roll-supporting spindles and guides located adjacent to said spindles at the sides of the field of exposure, in such proximity to the back of the film-roll carrier, as to allow a film to be looped around said guides and passed twice between the guides and the back, whereby the backing of the film will form a shield extending from each guide to the adjacent spindle and preventing the spread of light sidewise from the field of exposure.

3. The combination with a back having film-roll-supporting spindles, of guides located adjacent to the back upon the inside of the spindles, whereby a film having a non-actinic backing may be threaded in engagement with the spindles and with the said guides in such a manner that the backing will pass twice between the guides and the back, and whereby the backing will between each of said guides and the adjacent spindle form a shield preventing the spread of light sidewise from the field of exposure.

4. A photographic-film-roll carrier, comprising film-roll-supporting spindles and guides located adjacent to the back of the carrier and adapted to have the film looped around them, said guides being movable toward and from the back of the carrier.

5. In a camera, the combination with the back and the film-roll supports, of a transparent plate which is of relatively low actinity, arranged in the said back, so as to allow a portion of the film backing to be viewed, said plate being of a size corresponding approximately to the field of exposure so that the said plate may be used for focusing purposes when the film is removed.

6. In a camera, a focusing-screen which consists of colored transparent material.

7. In a camera, the combination with film-supports, of a frame movably connected with the camera, and carrying a colored transparent plate which, in one case, allows the backing of the film to be viewed, and in the absence of the film is adapted to serve as a focusing-plate.

8. In a camera, a back having film-supports and provided with a transparent non-actinic plate of a size corresponding to the field of exposure, in combination with a cover adapted to conceal said plate.

9. In a camera, the combination with a film-supporting back, of an auxiliary frame movably connected with said back, a non-actinic transparent plate carried by said frame, and a movable lid or cover also carried by said frame.

10. A photographic-film-roll carrier, comprising film-roll-supporting spindles and guides located adjacent to the back of the carrier and adapted to have the film looped around them, said guides being movable toward and from the back of the carrier, and springs for normally pressing the guides toward the back of the carrier.

11. In a camera, the combination with a film-roll carrier, of guiding means for so directing the film that the backing thereof will form shields at the sides of the field of exposure, said guiding means being movable toward and from the back of the camera.

12. In a camera, the combination with a film-carrier, of a transparent non-actinic plate of a size corresponding to the field of exposure, said plate being located immediately in the rear of the space occupied by that portion of the film which is in the field of exposure, and a cover arranged to normally conceal said plate and provided with an opening through which a portion of the plate may be observed when the cover is closed.

13. In a camera, the combination, with film-supports, of a colored transparent plate movably connected with the camera at the back thereof, and allowing, in one case, the backing of the film to be viewed, and being adapted to serve as a focusing-plate when the film is removed, while by moving said colored plate a space may be cleared for the reception of a sensitized plate.

In testimony whereof I have signed my name to this specification in the presence of two subscribing witnesses.

DANIEL GRAF.

Witnesses:
   JOHN LOTKA,
   EUGENE EBLE.